Feb. 28, 1939.  A. BOKEMÜLLER  2,148,854
TWO-STROKE INTERNAL COMBUSTION ENGINE
Filed Aug. 11, 1936  2 Sheets-Sheet 1

Inventor.
Alfred Bokemüller
by A. A. Dicks
Attorney

Patented Feb. 28, 1939

2,148,854

UNITED STATES PATENT OFFICE 2,148,854

TWO-STROKE INTERNAL COMBUSTION ENGINE

Alfred Bokemüller, Gaggenau, Baden, Germany, assignor to Daimler-Benz Aktiengesellschaft, Stuttgart-Unterturkheim, Germany Application August 11, 1936, Serial No. 95,308
In Germany May 2, 1934

6 Claims. (Cl. 123—65)

The invention concerns an improvement for two stroke internal combustion engines and consists essentially in a regulating device by which the governing angle between the closing moment of the exhaust can be adjusted relatively to the closing moment of the admission, so that the exhaust can be closed either earlier or later than the admission, or at the same time as the admission.

Accordingly, an object of this invention is the provision of improved means for controlling the exhaust valve of an internal combustion engine, relative to the ignition, in such a manner that the exhaust can be closed earlier, simultaneously, or later than said ignition.

Another object of this invention is the provision of means for increasing the torque and efficiency of an internal combustion engine without supercharging.

Further objects and advantages of this invention will be apparent from a consideration of the specification as illustrated by the accompanying drawings of possible embodiments of the invention, in which drawings.

Figure 1:
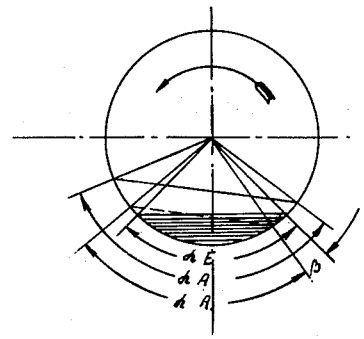
Fig. 1 is a control diagram illustrating the principles of this invention.
Figure 2:
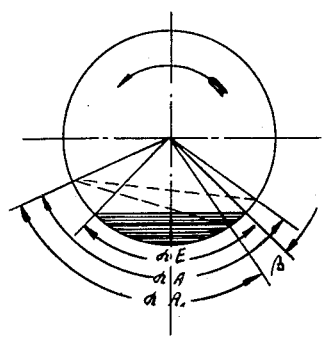
Fig. 2 is a diagram similar to Fig. 1 but showing a modified control.

In the drawings, the Figures 1 and 2 show, by way of example, two controlling diagrams, drawn with reference to the position of the crankshaft. The direction of rotation has been indicated by an arrow. The angle E is the opening angle of the admittance controlled e. g. by the piston, while the opening angle of the exhaust is indicated at normal running of the engine with A and at supercharging running with A'. The angle B is shown as the supercharging angle. In case of Fig. 1 the beginning and the closing of the exhaust is uniformly adjusted; in case of Fig. 2, however, only the exhaust closing is regulated.

As generally supercharging is employed with medium and smaller numbers of revolutions of the crankshaft, and, as on the other hand, the sections of the scavenging and exhaust time are measured for the highest number of revolutions, the diminution of the outlet angle with supercharging is not accompanied by any essential disadvantages for the scavenging effect.

Figure 3:
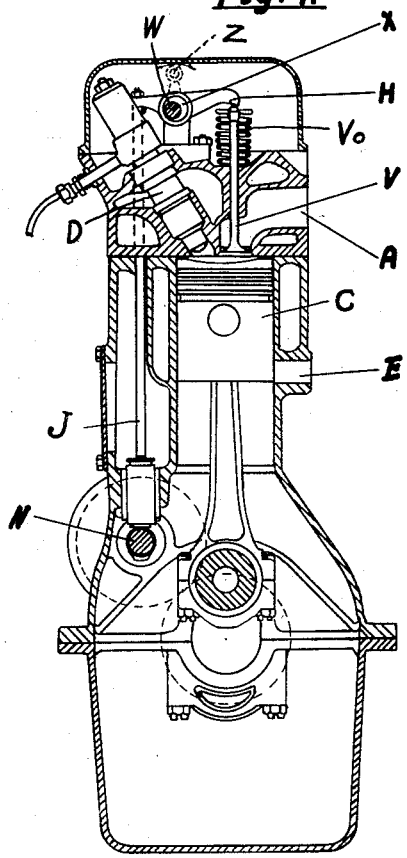
Fig. 3 is a cross-sectional view of an internal combustion engine showing an adjustable valve control.
Figure 4:
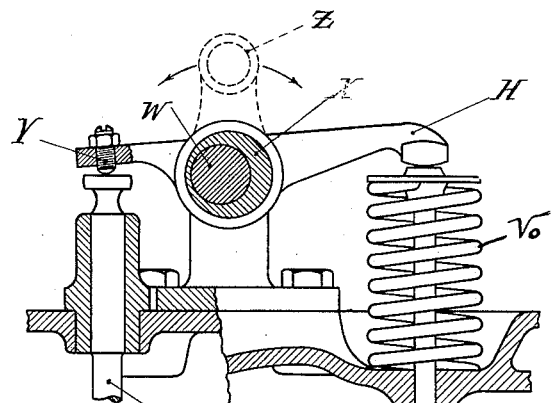
Fig. 4 is an enlarged view of the adjusting means illustrated in Fig. 3.

In Figs. 3 and 4, A is the outlet, and E the inlet which is controlled by the piston C acted upon by the crank shaft L. The fuel is injected into the cylinder or, if desired, a precombustion chamber, by means of a nozzle D.

The outlet A is controlled by a valve V operated by an oscillating lever H which, in turn, is controlled by means of a rod J bearing against the cam shaft N. The lever H is rotatably journaled on an eccentric X carried rotatably on the rod W and adjusted by the lever Z. By means of an adjustable screw Y, the lever H bears against the upper end of the rod J, and a spring V₀ holds these parts in positive engaging relationship. By adjusting the eccentric X a play is brought about between the lever H and the valve V so that the latter, in accordance with its adjusted position, may be opened relatively early or late. By means of such a construction the kind of regulation shown diagrammatically in Fig. 1 is brought about.

Figure 5:
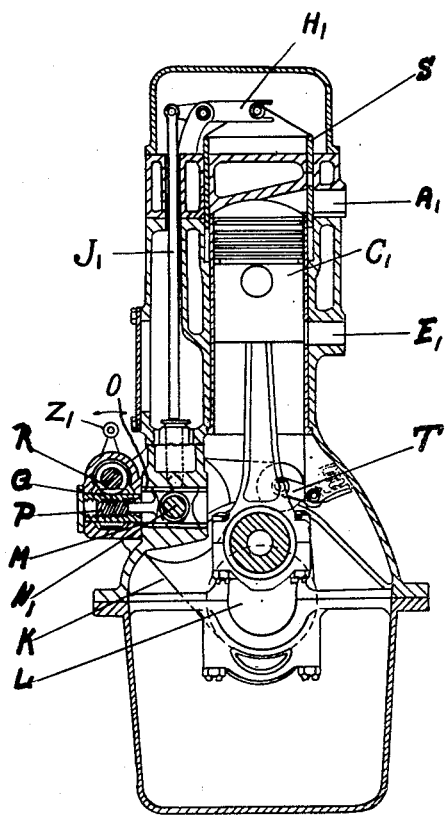
Fig. 5 is a cross-sectional view of an internal combustion engine showing a modified form of control.

In the case of the modification shown in Fig. 5, A₁ is the outlet, and E₁ the inlet controlled by the piston C₁. The outlet is controlled by the sleeve S which is moved by means of the oscillating lever H₁, the rod J₁, and the cam shaft N₁. The latter is preferably journaled at both ends of the motor in bearings M which are formed as sliding members and are transversely shiftable in the guides O. For this purpose the bearings are provided with threaded spindles P. The nuts Q threaded upon the spindles and held against longitudinal shifting have a worm thread with which a worm wheel positioned upon a rod which may be adjustable, for example, by means of the lever Z from the driver's seat, engages. By turning the worm rod by means of the lever Z or the like, the cam shaft can be shifted to the right or left and therewith the beginning and end of the outlet valve opening can be brought about sooner or later. The cam shaft is preferably driven by means of a chain K tensioned by an intermediate pulley T acting under the force of a spring and connected with the crank shaft L.

Figure 6:
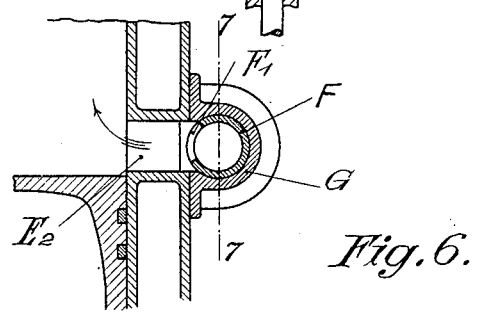
Fig. 6 is an enlarged cross-sectional view of a form of inlet control taken along the line 6—6 of Fig. 7.
Figure 7:
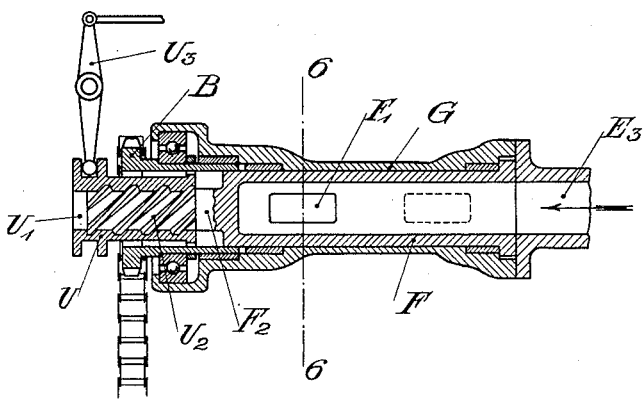
Fig. 7 is a side view, partially in cross-section, showing the inlet slide valve and drawn along the line 7—7 of Fig. 6.

In the example shown in Figs. 6 and 7, a rotatable sleeve F with control openings F₁ is rotatably journaled in the attached housing G, and is connected to the inlet E₂ through which the cleaning and charged air is easily guided from the suction conductor E3. The drive is taken from the motor crank shaft by means of a sprocket wheel B. The latter is coupled by means of a key with a socket joint U adjustable in the direction of rotation; the key permits longitudinal shifting. In the inside of the socket joint U there is provided a thread shaped key U1 which engages a corresponding groove U2 of a spindle shaped extension of the rotatable sleeve F.

A lever U3 serves for adjusting the socket joint U in such a manner that by a shifting of the same to the right or to the left a relative turning between the sprocket wheel B and the control sleeve F takes place, resulting in an earlier or later closing off of the inlet.

It will be seen therefore that I have provided a construction which satisfies the objects enumerated above and while I have shown the invention in certain physical embodiments, it is to be understood that modifications of the structure shown may be made by those skilled in this art without departing from my invention as expressed in the claims which follow.

What I claim is:

1. A two stroke internal combustion engine with an admission and an exhaust device, means operable during operation of the engine for changing the closing time of the exhaust controlled by the exhaust device relatively to the closing time of the admission controlled by the admission device, whereby the said means have such a large range of adjustment that the exhaust can be closed earlier, simultaneously or later than the admission.

2. A two stroke internal combustion engine with ports of admission, controlled by the piston, and arranged in the lower part of the cylinder, an exhaust device at the upper part of the cylinder, governing means for the exhaust-controlling device, designed to have such a large range of adjustment during operation of the engine that the exhaust can be closed earlier or later than the inlet or simultaneously with the inlet.

3. A two stroke internal combustion engine with admission ports controlled by the piston and arranged in the lower part of the cylinder, an exhaust valve in the cylinder head, a rocking lever for controlling the exhaust valve, the rocking lever supported by an eccentric which has such a large range of adjustment that the exhaust can be closed earlier as well as later than the admission, or simultaneously with the same.

4. A two stroke internal combustion engine with admission ports, controlled by the piston and arranged in the lower part of the cylinder, exhaust ports at the upper end of the cylinder, a sleeve for controlling the exhaust ports, a camshaft for controlling the sleeve, which can be transversely displaced for adjusting the controlling times, and having such a large range of adjustment that the exhaust can close earlier, as well as later, than the admission, or simultaneously with the same.

5. In a two stroke internal combustion engine, means interconnected with said engine for controlling the admission of fluids thereto, means interconnected with said engine for controlling the exhaust thereof, and means operable during operation of the engine for adjusting, said last means so constructed and arranged that said exhaust can be closed earlier, simultaneously, or later than said admission.

6. In an internal combination engine having admission and exhaust ports, means operatively interconnected with said engine for opening and closing said ports, the means for controlling said exhaust port comprising, in combination, a sleeve, a linkage mechanism adapted to oscillate said sleeve, a cam shaft driven by said engine for acting upon said linkage mechanism, bearing means for said cam shaft, and adjustable means for transversely moving said bearing means, whereby the engagement of said cam shaft with said linkage mechanism is varied.

ALFRED BOKEMÜLLER.